United States Patent [19]
Woerner et al.

[11] 3,862,020
[45] Jan. 21, 1975

[54] PRODUCTION METHOD FOR POLYCRYSTALLINE SEMICONDUCTOR BODIES

[75] Inventors: Lloyd M. Woerner, Tittabawassee Twp., cty. of Saginaw; Cedric G. Currin, Midland, both of Mich.

[73] Assignee: Dow Corning Corporation, Midland, Mich.

[22] Filed: Dec. 7, 1970

[21] Appl. No.: 95,732

[52] U.S. Cl............ 264/81, 117/106 A, 117/106 C, 264/61
[51] Int. Cl............................................ C04b 35/00
[58] Field of Search....... 264/81; 117/106 A, 106 C, 117/212

[56] References Cited
UNITED STATES PATENTS

| | | | |
|---|---|---|---|
| 2,967,115 | 1/1961 | Herrick | 264/81 UX |
| 2,938,772 | 5/1960 | Enk et al. | 117/106 A X |
| 2,989,421 | 6/1961 | Novak | 264/81 UX |
| 3,011,877 | 12/1961 | Schweickert et al. | 117/106 A X |
| 3,020,128 | 2/1962 | Adcock et al. | 23/223.5 |
| 3,239,372 | 3/1966 | Sirtl | 117/106 A X |
| 3,410,746 | 11/1968 | Turkat et al. | 264/81 X |
| 3,436,255 | 4/1969 | Harris et al. | 117/106 A X |
| 3,476,640 | 11/1969 | Sirtl et al. | 264/81 X |
| 3,523,035 | 8/1970 | Whitlow | 117/106 C X |

*Primary Examiner*—Donald J. Arnold
*Assistant Examiner*—John Parrish
*Attorney, Agent, or Firm*—Howard W. Hermann

[57] ABSTRACT

Method for producing solid rods of polycrystalline semiconductor material such as silicon by thermal decomposition of vapors on interior surface of a closed end hollow form. Form is either of same material as that to be deposited or is coated with diffusion resistant layer to prevent introduction of impurities into deposited material. An injection lance is used to introduce vapors near point of closure of cylinder and is gradually withdrawn as deposition progresses.

17 Claims, 3 Drawing Figures

PATENTED JAN 21 1975 3,862,020

INVENTORS
CEDRIC G. CURRIN
LLOYD M. WOERNER

BY Howard W. Hermann
ATTORNEY

PRODUCTION METHOD FOR POLYCRYSTALLINE SEMICONDUCTOR BODIES

BACKGROUND OF THE INVENTION

This application relates to methods for producing solid bodies of polycrystalline semiconductor material by thermal decomposition of vapors.

Many methods have been described in the past for the manufacture of ultrapure semiconductor materials such as silicon and germanium. The most common process in use commercially today utilizes equipment such as that shown in U.S. Pat. No. 3,011,877 issued to Schweickert et al. In this system, rods of the semiconductor material to be used are connected in an inverted U-shaped configuration and the legs are connected to a source of electrical power to resistance heat the rods. The rods are placed in a bell jar and vapors of the gas to be decomposed are injected into the bell jar and decomposed, depositing the semiconductor material on the rod. Usually, trichlorosilane and hydrogen are used as a feed gas, although other raw materials can be used, for the manufacture of silicon and the rods are heated to a temperature between 1,100° and 1,200°C. In the case of germanium, germanium tetrachloride is the usual starting substance, again employing hydrogen as a carrier gas and reduction agent. In that case, the deposition temperature is in the range between 700° and 800°C.

While the process making use of the equipment shown in the Schweickert et al. patent has achieved widespread commercial success, there are numerous inherent disadvantages to that process. First of all, most uses of semiconductor materials in the manufacture of electronic devices require lengths of rod-shaped material. The silicon rods coming out of the reactor in this prior art process are U-shaped, thereby causing loss in the vicinity of the bends. While the bridge material can be melted down to grow crystals, it is less efficient than being able to use a straight piece of rod. Secondly, the rate of deposition of silicon in the Schweikert et al. reactor based on the amount of gas being fed into the system could be greatly improved since much of the gas does not come immediately into contact with the heated rods in the reaction chamber.

Further, the process requires a substantial amount of electrical power and critical control equipment since the resistance of the semiconductor materials, particularly silicon, varies substantially with temperature. Therefore, to maintain constant temperature at the surface of a growing rod, very careful control of electrical input is required. Complicating this factor still more is the danger of a power failure during the process of growing a large rod of silicon. Since the growth time on some of these rods being currently produced in on the order of several weeks, this is not an uncommon occurrence. Power failure often causes uneven cooling of the rods, resulting in thermal stresses and cracking. Even if the rod survives the cooling process, restart-up requires inordinate amounts of power if it can be accomplished at all.

Further disadvantages occur in attempting to control diameter of the rods being produced in the reactor since the growth tends to be nonuniform over the length of the U-shaped configuration. As the rods increase in diameter it is also extremely difficult to control the surface finish of the rod which varies greatly with the temperature of deposition. The attachment of electrodes, generally carbon, to the silicon rods is an extremely important source of impurities introduced into the reaction chamber and incorporated into the deposited silicon. In large silicon or germanium producing facilities, the space requirement of a large number of bell jars is exceedingly high compared to other types of systems. Breakage of bell jars, is another major expense because the bell jars must also be of high quality material.

In view of these and other disadvantages, it is not surprising that several other approaches have been taken to the growing of semiconductor materials from the vapor phase. One of these approaches is the deposition of silicon on the interior of a cylindrical quartz tube as exemplified by U.S. Pat. No. 2,398,772 to Enk et al., and U.S. Pat. No. 3,020,128 to Adcock et al. While eliminating many of the disadvantages of the reactor disclosed in the Schweickert et al. patent, previously mentioned, this approach produces disadvantages of its own.

First of all, the resulting rod of semiconductor material is a cylinder rather than a solid rod. The cylindrical shape is difficult to handle in producing crystals for use in the manufacture of semiconductor devices. For single crystal production, the polycrystalline material is melted and single crystals are grown from it. While the so-called Czochralski method makes use of a crucible for growing single crystal, each crucible may be used only once before being destroyed in the process. Since the crucibles are made of quartz, it is desirable to completely fill the crucible with melt for reasons of economy. The Czochralski process, however, tends to introduce oxygen into crystals which for some devices is quite detrimental. Therefore, the float zone method of producing crystals is a very common one commercially. In the float zone process, a zone of the polycrystalline rod is melted at one end of the rod. The seed crystal is touched to the molten zone. Then the zone is moved along the length of the rod converting the polycrystalline rod to a single crystal. The float zone process cannot be used with a hollow rod unless specifically designed equipment is used. Further, the use of quartz as a deposition surface for silicon as exemplified by the Enk et al. and Adcock et al. patents is a source of oxygen contamination in the polycrystalline material. As pointed out with respect to the Czochralski process, this is also undesirable in many applications.

SUMMARY OF THE PRESENT INVENTION

It is, therefore, a primary object of the present invention to provide a method of growing polycrystalline semiconductor material which eliminates insofar as possible the disadvantages heretofore mentioned with respect to prior art methods. In accordance with this and other objects there is provided by the present invention a process in which solid bodies of semiconductor material such as silicon are produced by starting with a hollow form and depositing on the interior surface thereof from the vapor phase. In its simplest form the present process makes use of a cylindrical form having a closure at one end thereof so that gases cannot pass through the hollow in the cylinder. A gas-feed lance is introduced from the open end of the cylinder to the vicinity of the closure and feed gases enter the cylinder from the lance.

The cylinder is, of course, heated as in the prior art although in the present invention a plurality of cylinders may be placed within an oven to provide sufficient heat. Feed gases such as trichlorosilane and hydrogen are introduced from the feed lance to impinge on the closure of the cylinder and deposit silicon on the adjacent cylindrical walls as well as the closure. Since the greatest concentration of unreacted gases, however in on the closure surface, due to turbulence, the greatest deposition takes place there. As deposition takes place, the lance is gradually withdrawn from the cylinder allowing the cylinder to completely fill with the semiconductor material. Gases are vented from the open end of the cylinder.

By this process, the position of the lance and pressure of the gases being supplied can supply maximum turbulence of gases to the point of desired deposition, providing maximum deposition rates and efficiency. The capital cost for power supplies, reactors and controls is considerably lower than that of the aforesaid Schweickert et al. patent. Practically the entire rod of semiconductor material is useful in the production of devices; i.e., there is no loss comparable to that of the bridges in the Schweickert et al. process. The exterior diameter of the rods produced can be very closely controlled, thereby meeting diameter specifications and providing exact diameters for one-piece crucible charges for the Czochralski process. Surface finish, of course, is also greatly improved. The outer cylinder prevents contamination of the silicon being deposited by other parts in the reaction chamber such as electrodes etc. By providing banks of cylinders in a single oven, the power efficiency of the system is greatly improved. The cooling rate can be carefully controlled since the cylinders can be completely contained, thus eliminating any cracking of the rods due to nonuniform cooling. In the case of a power failure, refiring of the system is no problem. The surface to be deposited on is always of approximately the same order of magnitude as compared to the Schweickert et al. system where the diameter of the rods in the reaction chamber varies substantially during the deposition process. This, of course, simplifies control.

BRIEF DESCRIPTION OF THE DRAWINGS

Other objects and attendant advantages of the present invention will become obvious to those skilled in the art from the following detailed description of the invention when read in connection with the accompanying drawings wherein.

DETAILED DESCRIPTION OF THE INVENTION

Figure 1:
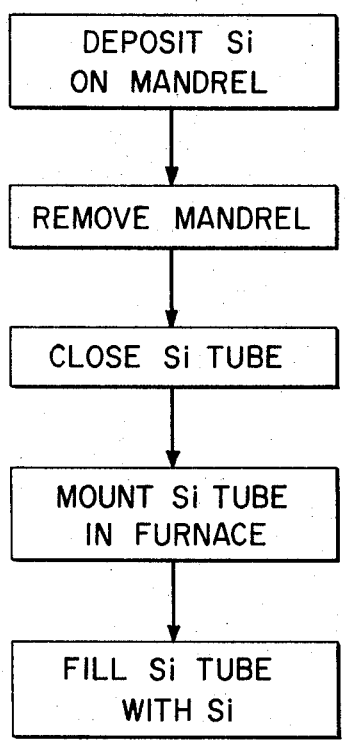
FIG. 1 is a block diagram of one embodiment of the invention.

Referring now to the drawings wherein like reference characters designate like or corresponding parts throughout the figures thereof, there is shown in FIG. 1 a block diagram illustrating the steps of a preferred embodiment of the invention. While the process can be used to provide any desired shape, the cylinder is chosen for purposes of illustration. At the outset then it is necessary to produce a hollow cylinder for deposition of the semiconductor material on the interior surface thereof. The term "cylinder" is used herein to denote not only true cylindrical shapes but shapes which approximate cylindrical shapes as well, such as domes, pyramids, cones and prisms, for example. There are presently numerous methods for producing hollow bodies of semiconductor material such as silicon. For example, hollow bodies can be produced using the processes disclosed in the aforementioned patents to Enk et al. and Adcock et al. by depositing on the interior surface of the quartz tube or the like.

Preferably, according to the present invention, silicon is deposited on the outside of a mandrel by thermal decomposition of silanes to form a silicon tube. The mandrel may be, for example, of tantalum or graphite. After deposition is built up to a thickness which is relatively easy to handle, for example, one-eighth inch, the mandrel is removed leaving the open cylinder of silicon. Some grades of graphite are known to have a thermal coefficient of expansion so that upon cooling they contract substantially more than the silicon allowing the graphite to simply drop out of the silicon tube or cylinder. If desired for release purposes, it is also possible to provide a fine amorphous layer of silicon at the mandrel surface before commencing normal deposition of polycrystalline to form the cylinder. This technique is mentioned, for example, in U.S. Pat. No. 3,128,154 to Bean et al. for release of materials such as tantalum from silicon. In an article by Sirtl and Seiter, *Journal Electrochemical Society*, Volume 113, Page 506 (1966) there is described the mixing of oxygen and/or carbon in the chlorosilanehydrogen feed to produce a finely amorphous silicon at a temperature between 1,050° and 1,100°C. For example, trichlorosilane, methyldichlorosilane and hydrogen in a ratio of 2:1:60 produces a deposit which is nearly amorphous and anisotropic which contains less than 1% silicon carbide as a second phase. A layer such as this has the added advantage of acting somewhat as a barrier to prevent diffusion of impurities from the carbon or tantalum mandrel into the silicon being deposited on it.

After the silicon cylinder or tube has been formed the hollow therein is closed at one point. While the closure may be at one end, it is preferable that the closure be provided at the center to allow deposition from both ends of the cylinder. To close the hollow in the cylinder, any suitable method can be used; however, it is preferred that a slice of silicon having a diameter substantially equal to the internal diameter of the cylinder be welded to the cylinder walls, for example by use of electron beam or induction heating to provide some melting. It is not essential that the closure absolutely seal the hollow in the cylinder, since at deposition temperature silicon will be deposited quickly to close any openings around the closure piece.

Figure 2:
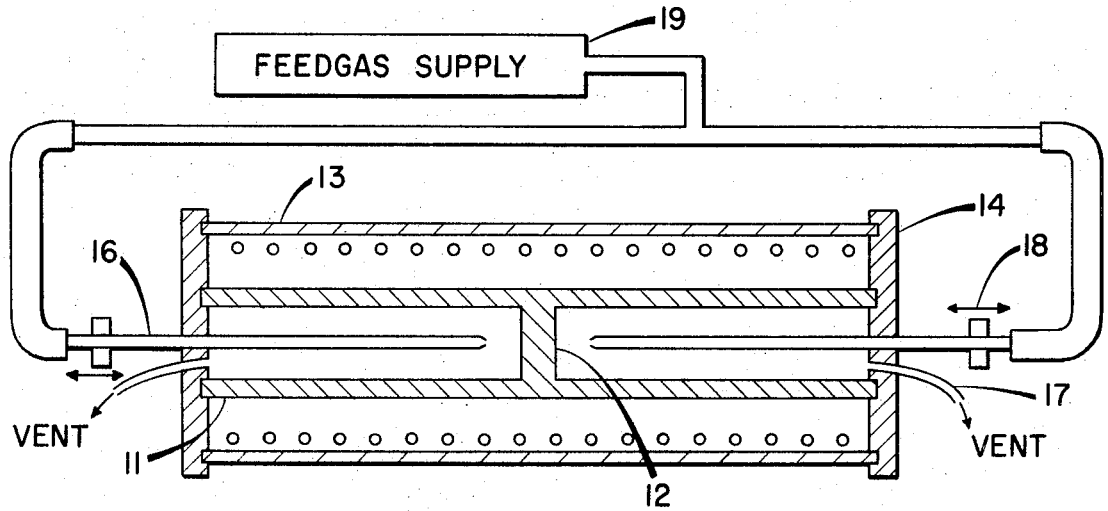
FIG. 2 is a schematic diagram showing the overall system for carrying out the method of the present invention with the reaction chamber shown in cross-section.

As is shown in FIG. 2, the longitudinal cross-section of the silicon cylinder 11 is substantially H-shaped, the closure being indicated at 12 and forming the crossbar of the H. The cylinder is now mounted in a furnace 13, which may be of any suitable material and which may contain provision for mounting any desired number of cylinders 11. However, for simplicity's sake, only one is shown in the drawing. The mounting plate closing the ends of the furnace is provided with recesses or shoulders for supporting the cylinder 11. The mounting plates 14 also have apertures through them for introducing a lance 16. The mounting plates 14 also must have apertures therethrough for a vent 17 which may be positioned alongside the injection lance 16. The injection lance 16 must be mounted for movement in or out of the cylinders 11 as indicated by the arrows 18. The injection lance 16 is connected to a feed gas supply 19 for supplying the desired feed gases to the system.

Figure 3:
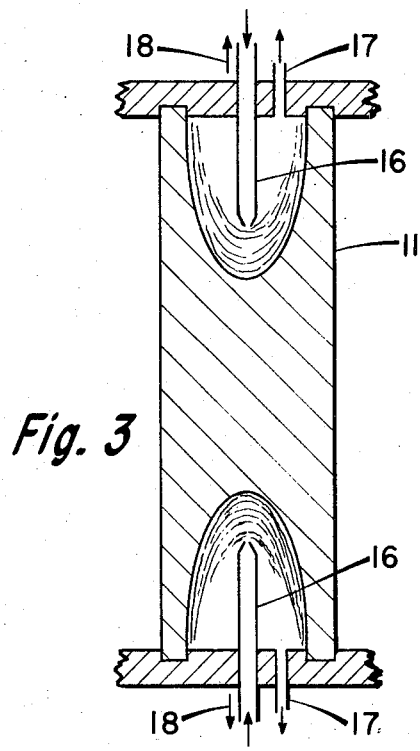
FIG. 3 is a cross-sectional view of a single silicon rod being produced in the reaction chamber according to the embodiment shown in FIG. 2.

In operation the feed lance is inserted into the cylinder to a position in proximity to the closure 12 in the cylinder. The precise position of the lance for optimum operation is variable depending upon the feed gases used, the diameter of the cylinder, the size of the lance, and the feed gas pressures. The position is chosen to provide maximum turbulence at the closure 12 without undue cooling thereof by the feed gases. Of course, the feed gases are preheated by the fact that the tube is heated and separate preheaters may also be used for the feed gas if desired. On the other hand, if the lance is long it is sometimes desirable to provide some cooling of the lance to prevent decomposition of the feed gases before the gases leave the lance. The cylinder is heated to the decomposition temperature of the feed gases being used. In the case of trichlorosilane mixed with hydrogen, the preferred decomposition temperature is in the range between 1,100° and 1,200°C. Similarly, optimum decomposition temperatures are used for other feed gases. The gases are introduced from the lance on the heated closure member 12 and silicon deposits on the closure member and the adjacent cylindrical walls of the cylinder 11. As the deposition continues, the lances are withdrawn at a rate corresponding to the rate of deposition on the closure member 12. This can be seen more clearly from the cross-section shown in FIG. 3, wherein the characteristic parabolic deposition shape of this invention is visible. Since maximum turbulence occurs at the point ahead of the injection lance 16, a supply of fresh reactant gases is maintained in that area. The flow toward the vent from the area ahead of the lance tends to become laminar causing boundary layer stagnation of the spent reactant gases and very little deposition on the cylindrical walls. Hence, there is no danger of the cylindrical walls closing in on the lance even though the walls are heated. Deposition continues and the lance is gradually withdrawn until the entire cylinder except for a slight concavity at each end is filled with the semiconductor material.

While the process has been disclosed specifically with respect to silicon, it should be realized that the same principles can be applied to other known materials such as germanium, which can be deposited from the vapor state and to any feed gases for these materials known in the art. Insofar as silicon is concerned, the criterion for feed gases generally is that hydrogen is included as a reducing agent and the raw material must be a silicon compound consisting in addition to silicon of at least one of the elements hydrogen, chlorine, bromine or iodine. For ease in handling, the chlorinated silanes such as trichlorosilane or hexachlorodisilane are preferred but the brominated silanes or monosilane ($SiH_4$) can also be used. Mixtures of these silanes also make suitable feed gases.

As pointed out previously, any desired number of deposition cylinders with their associated lances can be mounted in a single furnace and can be heated from a single heat source. This provides for efficiency of operation in minimizing equipment and power requirements.

While deposition on a silicon cylinder eliminates problems with respect to impurity introduction, it should be realized that the present invention can also make use of closed cylinders of other materials. Such materials can be any of those materials capable of withstanding the deposition temperatures of the material being produced from the vapor phase, depending of course upon raw materials, without substantial deformation or decomposition of the cylinder material. For example, closed cylinders can be made of quartz, carbon, tantalum, silicon carbide, molybdedum, tungsten, or stainless steel, among others. when materials, other than those of the semiconductor material to be produced are used for the cylindrical form, it is desirable, in addition to assuring that the purest materials available are used, to provide a diffusion resistant layer on the surface of the cylinder prior to deposition of the semiconductor material. It is known, for example, that most oxides tend to resist diffusion of those impurities which are particularly detrimental to silicon. Surface oxidation is commonly used as a masking technique in the manufacture of silicon semiconductor devices such as transistors. Similarly, nitriding is also useful in this regard.

It is further known that providing alternative layers of silicon and silicon oxide, for example, provides an even greater barrier to diffusion of elements such as boron or phosphorous. Silicon carbide also provides a diffusion resistant layer and may be combined with other layers to provide the necessary resistance to diffusion of impurities from the cylinder into the silicon being produced. Silicon oxide layers can be provided, for example, by coating the internal surfaces of the cylinder with a thin layer of silicon and then oxidizing the silicon in situ. By oxidizing only a surface layer of the silicon deposited alternating layers of silicon and silicon oxide can be produced by laying down further layers of silicon over the silicon oxide and oxidizing only the surface of the layers of silicon deposited.

In the case of graphite cylinders, silicon carbide can easily be produced by depositiong a layer of silicon on the graphite surface and raising the temperature of the coated graphite above the melting point of silicon to allow the silicon to melt into the surface of the graphite and combine with the graphite to form silicon carbide. Alternatively, silicon carbide can be vapor deposited directly by introduction of carbon and silicon containing gases such as dimethylidichlorosilane. Silicon oxide can then be applied over the surface of the silicon carbide by depositing an additional layer of silicon and oxidizing it.

In a specific example of the invention, the lance was a 0.25 inch internal diameter No. 316, stainless steel tube having its outlet initially positioned 7.5 cm. from the interior of the end of a 1¼ inch internal diameter 24 inch long graphite tube having one end closed by a graphite plug. The graphite tube was placed inside the two inch diameter quartz tube lining of a furnace. The furnace was held between temperature of 1,135° and 1,168°C. The system was first purged of air by allowing a flow of pure argon through the lance and following the purge a mixture of $HSiCl_3$ and $H_2$ was allowed to flow into the lance throughout the run.

In this examplary system, molar ratios of $H_2$ to trichlorosilane have been varied between 60 to 1 and 8 to 1 successfully, although both higher and lower feed gas ratios are believed suitable, as is common in other silicon deposition methods. In an examplary run, feed rates were about 0.58 mol/min. H₂ and 0.043 mol/min. HSiCl₃. Similarly, in another run near the opposite end of the scale, rates were about 0.73 mol/min. H₂ and 0.012 mol/min. trichlorosilane. In all cases there was deposition of silicon in the tube.

That which is claimed is:

1. The method of manufacturing solid bodies of semiconductor materials by chemical vapor deposition which comprises:
   making a hollow cylinder of said semiconductor material,
   closing the hollow in said cylinder at one portion along the length thereof with a cylindrical body of said semiconductor material having an axial length which is short in comparison to the length of said cylinder,
   heating said cylinder with a cylindrical body of said semiconductor material having an axial length which is short in comparison to the length of said cylinder, and
   directing a stream of heat decomposable gas containing said semiconductor material against the closure in said cylinder while said cylinder is heated to the decomposition temperature of said gas, whereby said semiconductor material is deposited on said closure and the adjacent walls of the hollow in said cylinder.

2. The method as defined in claim 1 wherein said stream of gas is carried into proximity with said closure by means of a gas injection lance introduced into the hollow.

3. The method as defined in claim 2 and further including withdrawing said lance from said hollow at a rate substantially equal to the rate of deposition of the semiconductor material on said closure, whereby the hollow in the cylinder is gradually filled with said semiconductor material.

4. The method defined in claim 1 wherein said closure is initially provided at substantially the center of said cylinder and lances are introduced from both ends of the cylinder thereby providing deposition on both sides of said closure.

5. The method defined in claim 4 wherein a multiplicity of said cylinders are heated from a single heat source.

6. The method defined in claim 2 wherein a multiplicity of said cylinders are heated from a single heat source.

7. The method of making solid rods of semiconductor grade silicon by chemical vapor deposition which comprises:
   making a hollow cylinder of material capable of withstanding the deposition temperatures of silicon from the vapor phase without substantial deformation or decomposition,
   closing the hollow in said cylinder at one portion along the length thereof with a cylindrical body of said semiconductor material having an axial length which is short in comparison to the length of said cylinder,
   heating said cylinder,
   directing a stream of a heat decomposable gas consisting of silicon and one or more of the elements hydrogen, chlorine and bromine against the closure in said cylinder while said cylinder is heated to the decomposition temperature of said gas, whereby silicon is deposited on said closure and the adjacent walls of the hollow in said cylinder, and
   removing the original cylinder material from the silicon body thus formed.

8. The method as defined in claim 7 wherein said stream of gas is carried into proximity with said closure by means of a gas injection lance introduced into the hollow.

9. The method as defined in claim 8 and further including withdrawing said lance from said hollow at a rate substantially equal to the rate of deposition of silicon on said closure, whereby the hollow in the cylinder is gradually filled with silicon.

10. The method as defined in claim 7 and further including prior to introducing said thermally decomposable gas into said cylinder, coating the internal surfaces of said cylinder with a diffusion resistant layer to prevent diffusion from said cylinder into the silicon deposited in later steps.

11. The method as defined in claim 10 wherein a layer of silicon is deposited on said internal surfaces of said cylinder and the internal surface of said layer is oxidized to form said coating.

12. The method as defined in claim 11 wherein a plurality of alternating layers of silicon and silicon oxide are applied to form said coating on the internal surfaces of said cylinder.

13. The method as defined in claim 10 wherein silicon carbide forms said coating on the internal surfaces of said cylinder.

14. The method as defined in claim 13 wherein said cylinder is graphite and said silicon carbide is formed by depositing a layer of silicon on the surface of said graphite and then raising the temperature of said cylinder to cause said silicon to melt into and react with the carbon of said graphite.

15. The method as defined in claim 14 and further including forming an additional layer of silicon oxide on the surface of said silicon carbide to form said coating.

16. The method as defined in claim 13 wherein a plurality of alternating layers of silicon and silicon oxide are applied over said silicon carbide to form said coating.

17. The method as defined in claim 8 including the step of continuously cooling said lance to a temperature below the decomposition point of said gas to prevent deposition internally thereof while injecting gas therethrough.

* * * * *